2,980,524
ABRASIVE COMPOSITIONS

John S. Morton, Chicago, Ill., assignor to Engis Equipment Company, Chicago, Ill., a corporation of Illinois
No Drawing. Filed Apr. 29, 1957, Ser. No. 655,466
1 Claim. (Cl. 51—293)

This invention relates generally to abrasives. More particularly, the present invention relates to novel abradant compositions which include a stable and uniform suspension of precious stone abrasive particles or their synthetic equivalents.

Broadly speaking, my invention embraces compositions comprising precious stone abrasive particles such as diamond particles, in a stable water-soluble carrier, including a fluid dispersing agent for said particles and a water-soluble wax-like substance. I may also include in the carrier coloring material to inform the user of the grade of the product. My invention also comprehends processes for making my novel abradant compositions.

Because of their extreme hardness and high abradant effectiveness, abrasives such as loose diamond powders have been widely used for the grinding, lapping and polishing of very hard materials. However, because of the costly nature and high specific gravity of precious stones, abrasive compositions manufactured therefrom have posed a special and difficult problem in their particular art. Formerly the diamond particles were dispersed in olive oil before use. However, because of the high specific gravity of the abrasive particle, the suspension was temporary and required frequent stirring. In addition, the olive oil had to be removed from the work with cleaning solvents, use of which was objectionable. Because olive oil was an unsatisfactory carrier, the abrasive compositions currently employed contain the diamond abrasive particles in carriers which can be washed from the work with water.

Although the carriers for most of the available diamond abrasives are relatively stable and water washable, a diamond abrasive having a water soluble carrier has not been available. Water soluble carriers are highly desirable because, after use, the precious, and at times scarce, diamond can be easily and completely separated and reclaimed by a method wherein hazardous and objectionable chemicals are not used. At the present time, diamond particles in the compositions usually are not reclaimed after use because many conventional carriers contain silica or the like and hence are not completely water-soluble, and in the spent material therefrom the diamond particles are mixed with a silica sludge. For this reason it has been impractical to separate the diamond from the sludge because it is necessary to use poisonous and/or toxic agents for this separation.

My invention provides a range of precious stone abrasives in water-soluble carriers which may be factory produced to exact specifications of particle size, abrasive concentration, and consistency, necessary to achieve optimum results upon a particular piece of work. My compositions are solid under shipping and storage conditions, yet they melt speedily under conditions of use so that cutting begins quickly after their application to the work. My compounds maintain the abrasive particles in stable and uniform suspension and can be stored at normal temperatures for a very long period of time. By choosing one of my compounds with appropriate physical characteristics, the operator may apply the abrasive to the work in many forms, as for example, in controlled metered quantities by the use of ordinary syringes, as a continuous metered feed, or in paste form for application to the work or to the tool.

The compositions, of course, may be completely washed from the work with water, thus eliminating the use of organic solvents. They are also dispersible in oil, and, if desired, can be thinned or cut with water, glycols, cutting oils and other solvents.

It is an object of the instant invention to provide stable and uniform suspensions of precious stone particles or their synthetic equivalents, which suspensions are solid or pasty under shipping and storage conditions, but which easily spread over the work under conditions of use.

A further object of the instant invention is to provide abrasive compositions containing diamond particles in a water-soluble carrier and having pre-selected physical characteristics and working properties, and also to provide processes for their production.

These and other objects of the invention will be apparent from the description which follows.

My abrasive compositions vary in consistency from thin pastes to hard solids which may be produced in any desired shape. In the preparation of these compositions, abrasive particles such as diamond particles having a size between about ¼ and about 200 microns are distributed evenly throughout a dispersing agent. While this dispersion is maintained by agitation, a wax-like material is added to the dispersion, and the resultant mixture is heated with agitation until it is uniform. The resulting composition is agitated while it is cooled.

In order that the invention may be clearly comprehended even to its details, the same is illustrated by specific examples setting forth proportions on a weight basis of the diamond particles, the dispersing agent, and the wax-like carrier. These examples are to be taken as illustrations of the present broad inventive concept and are not to be construed in any limitative sense.

EXAMPLE I

| | Grams |
|---|---|
| Abrasive: Diamond particles (about 2 to 3 micron size) | 10 |
| Dispersing agent: Polyalkylene glycol (Ucon 50 HB) | 60 |
| Carrier: Polyethylene glycol (Carbowax 4000, melting point 50°–55° C.) | 30 |
| | 100 |

In the manufacturing process, the diamond particles are cleaned, for example, with chromic acid and then washed with distilled water. The particles are then dispersed with a liquid polyalkylene glycol, and the resulting mixture is agitated while the carrier polyethylene glycol is added. The mixture is heated with continued agitation and becomes thinner in consistency and uniform. The resulting uniform mixture is agitated while it cools so that the suspension remains uniform while the carrier sets.

The cooled material is an adhesive, soft, pasty solid which has a melting point between about 50° C. and about 55° C. This composition can be quantitatively flushed from the work with water because the abrasive carrier is water-soluble.

The dispersing agents employed in my novel compositions are water-soluble polyalkylene glycols. A typical example of suitable glycols are sold under the trade name of "Ucon" and are designated as the 50–HB series by Carbide and Carbon Chemicals Corporation and are described in detail in "Ucon Fluids and Lubricants" (copyright 1955, 1956 by Union Carbide and Carbon Corp.). These polyalkylene glycols are essentially water-soluble liquids which are non-toxic if not taken internally.

The solid wax-like carrier is a polymerized ethylene oxide of high molecular weight. Carbide and Carbon Chemicals Corporation sell several products of this type which are known as Carbowax. The preferred carrier is Carbowax 4000, which is a hard waxy solid and which is soluble in water. It has a molecular weight of about 4000 and a melting point between 50° C. and 55° C. However, if a softer wax is desired, Carbowax 1500, having a Vaseline-like consistency, may be employed. If a stiffer composition is desired, Carbowax 6000, which is a very hard wax, may be employed. Any of these Carbowax products, which are polyethylene glycols and which are water-soluble, may be used and selection of the particular carrier depends upon the consistency desired in the product.

My compositions will keep in permanent and uniform suspension diamond particles from about ¼ micron size to about 200 micron size. However, for most types of work, the size of the particles used is between about 2 and about 50 micron size. Other precious stone abrasives such as rubies and sapphires, and synthetic abrasive equivalents, can be used in place of the diamond dust.

I have found that the larger the particle size, the more abrasive by weight can be incorporated into a carrier of a given consistency. On the other hand, the consistency of the composition depends entirely on the other ingredients exclusive of the abrasive, that is, the dispersing agent and the solid wax-like carrier. Therefore, the consistency may easily be adapted to a given abrasive content and particle size. Although the diamond content of the instant compositions may be up to about 50% by weight, for most purposes the diamond content is between about 2 and about 20% by weight of diamond particles having a size between about 2 and about 5 microns. It is usually desired that the composition is neither brittle nor so thin that it will not hold its shape. In other words, it should have the consistency similar to toothpaste so that it can be placed on the work and will spread easily. To obtain this consistency, the diamond particles are mixed with sufficient liquid polyalkylene glycol to wet and disperse them, and sufficient solid polyethylene glycol is added to give the desired stiffness to the composition. Generally, the percent by weight of solid polyethylene glycol is about ½ that of the dispersing agent. However, if somewhat thinner composition is desired, or if the diamond particles are very small, the quantity by weight of solid carrier may be about ⅓ that of the dispersing agent. If a stiffer composition is desired, the percent by weight of solid glycol used may be up to about 80% of the weight of the liquid dispersing agent.

If desired, coloring material can be added to the abrasive compositions to indicate the grade thereof. For example, the different abrasive compositions containing various sizes and percentages of diamond particles may each be colored differently through the use of conventional dyes, and users become accustomed to using a certain color for a particular type of job. The color does not affect the performance of the abrasive composition but is merely for convenience and is indicative of the grade or type of the composition. Other additives having well known functions can also be incorporated into the instant compositions when such functions are desired. Example II illustrates a composition containing coloring material.

EXAMPLE II

| | Grams |
|---|---|
| Abrasive: Diamond or sapphire powder (40 microns in particle size) | 20 |
| Dispersing agent: Polyalkylene glycol (Ucon 50 HB) | 54 |
| Carrier: Polymerized ethylene oxide (Carbowax 4000) | 26 |
| | 100 |

Dye: Q. s. (about .01–1.0 gram).

The process of preparing the above composition is similar to the process described under Example I, except that I dissolve a very small amount of a dye in water, filter it, and mix the filtrate into the Ucon before the Ucon is mixed with the other ingredients. Since the abrasive composition usually is applied to the work by the bare fingers of the operator, I use a dermatologically innocuous coloring agent, such as a coal-tar color certified for cosmetic use by the Food and Drug Administration, Federal Security Agency. The following are a few representative colors which tend to remain in the composition and are washed away therewith:

Table I 1-p-phenylazophenylazo-2-naphthol (D & C Red No. 17)
Alpha - (o-Nitro-p-anisylazo)-o-acetoacetotoluide (Ext. D & C Orange No. 1)
1-phenylazo-2-naphthylamine (FD & C Yellow No. 3)
1,4-bis(amylamino)-anthraquinone (Ext. D & C Blue No. 5)
1,4-bis(p-toluino)-anthraquinone (D & C Green No. 6)

The following list illustrates representative water soluble certified colors which may be incorporated into my compositions. These colors leach into the wash water. Accordingly, when the used wash water no longer shows the color of the dye, the operator is assured that all the abrasive composition has been washed off the work:

Table II

Disodium salt of 8-acetamido-2-p-acetamido-phenylazo-1-naphthol-3,6-disulfonic acid (Ext. D & C Red No. 1)
Disodium salt of 9-o-carboxyphenyl-4,5-dichloro-6-hydroxy-3-isoxanthone (D & C Orange No. 9)
Disodium salt of 2,4 - dinitro - 1 - naphthol-7-sulfonic acid (FD & C Yellow No. 1)
Disodium salt of 1,5-bis(o-sulfo-p-tholuino)-anthraquinone (Ext. D & C Violet No. 1)
3-methochloride of 9-dimethylamino-3-methylimino-3-isophenothiazine (Ext. D & C Blue No. 1)
Disodium salt of 1,4-bis(o-sulfo-p-toluino)-anthraquinone (D & C Green No. 5)

All of the above abrasive compositions are stable and uniform and are especially designed for applications where water-soluble, water washable compositions are desired. However, they are also dispersible in oil, and if desired can be thinned with a cutting oil as well as with water, glycols, or other solvents.

As previously mentioned, my abrasive compositions are also unique because after use, if it is desired, the precious stone particles can easily be reclaimed and without use of hazardous chemicals.

With the proportions of ingredients specified in the above examples, the resulting compositions are pastes which hold their shape but spread on the work easily. However, by varying the proportions of the polyalkylene glycol dispersing agent and of the polyethylene glycol wax base, the consistency may be adjusted to the application for which the composition is intended. The varying of the proportions of said ingredients to achieve specific physical characteristics in my abrasive compounds is an important feature of my invention which permits the user to preselect a composition having characteristics adapted to the work at hand.

Having fully described and illustrated the character of the instant invention, what is desired protected by Letters Patent is:

A method for producing stable uniform compositions of precious stone abrasive particles up to 200 microns in size in a water-soluble carrier wherein said particles can be easily salvaged from the spent compositions after use, consisting essentially of dispersing said particles throughout water-soluble fluid type polyalkylene glycol fluid in about the proportion by weight of 2 units of fluid to 1 unit by weight of abrasive particles; adding water-soluble, normally solid, highly polymerized ethylene oxide of molecular weight 4000 to the resulting dispersion, the solid comprising at least about one-third of the weight of the fluid; heating and agitating the resulting mixture until uniform; and agitating the resulting uniform mixture while it cools and until it sets.

References Cited in the file of this patent
UNITED STATES PATENTS

| | | |
|---|---|---|
| 1,637,291 | Barnett | July 26, 1927 |
| 2,501,145 | Smith | Mar. 21, 1950 |
| 2,649,362 | Fowler | Aug. 18, 1953 |
| 2,696,151 | Ellis | Dec. 7, 1954 |